(12) United States Patent
Leonor

(10) Patent No.: US 6,591,742 B1
(45) Date of Patent: Jul. 15, 2003

(54) PLANTAIN PEELER

(76) Inventor: Anaiboni E. Leonor, 119 Forest Hill St. #1 A, Boston, MA (US) 02130

( * ) Notice: Subject to any disclaimer, the term of this patent is extended or adjusted under 35 U.S.C. 154(b) by 0 days.

(21) Appl. No.: 10/342,460

(22) Filed: Jan. 14, 2003

(51) Int. Cl.[7] ............................. A23N 7/00; A23N 7/04; A23N 7/10
(52) U.S. Cl. ............................. 99/589; 99/584; 99/590; 99/591
(58) Field of Search ............................. 99/537–541, 623, 99/643, 584–591; 83/863, 864, 883, 857; 426/481–483; 30/123.5, 113.1

(56) References Cited

U.S. PATENT DOCUMENTS

| | | | | |
|---|---|---|---|---|
| 2,396,444 A | * | 3/1946 | Singer | 99/537 X |
| 4,212,237 A | * | 7/1980 | Hsu | 99/589 |
| 4,430,931 A | * | 2/1984 | Hsu | 99/589 |
| 4,446,782 A | * | 5/1984 | Black | 99/589 |
| 4,627,214 A | * | 12/1986 | Anderson et al. | 83/499 X |
| 4,738,195 A | * | 4/1988 | Berube et al. | 99/591 X |
| 5,105,735 A | * | 4/1992 | Gonzalvo | 99/590 |
| 5,146,681 A | * | 9/1992 | Haghkar | 99/589 X |
| 5,497,552 A | * | 3/1996 | Rodriguez et al. | 30/123.5 |
| 5,669,293 A | * | 9/1997 | Sommer | 99/589 |
| D435,404 S | * | 12/2000 | Gingras et al. | D7/693 |
| 6,253,670 B1 | * | 7/2001 | Gingras | 99/589 |

* cited by examiner

Primary Examiner—Timothy F. Simone

(57) ABSTRACT

The plantain peeler is a kitchen appliance that allows a person to easily and efficiently remove the skin from plantains. The device would consist of a slicing mechanism and a peeling mechanism integrated into a housing with a discard tray at the bottom and a plastic backsplash surrounding the peeling mechanism. The slicing mechanism would consist of four semicircular blades connected to a circular guide which rotate towards each other when activated and would be used to slice the tip from a plantain. The peeling mechanism would consist of four arcuate blades arranged in a circular manner that would force the peel from the plantain as it passes through the mechanism. A discard tray would be provided at the bottom of the device to catch the peel, a tip retrieval opening would be provided in the housing behind the slicing mechanism, and a plantain retrieval passage would be provided in the housing behind the peeling mechanism.

20 Claims, 4 Drawing Sheets

PLANTAIN PEELER

BACKGROUND OF THE INVENTION

1. Field of the Invention

The present invention relates to a kitchen appliance for use in connection with peeling plantains. The plantain peeler has particular utility in connection with easily and efficiently removing the rough exterior from plantains.

2. Description of the Prior Art

Plantains are a highly nutritious vegetable and are used as a staple food in many tropical countries. The vegetable is used similarly to the way potatoes are used as a staple in some diets and can be substituted in recipes calling for starchy vegetables like potatoes. Plantains can be added to soups and stews, boiled and mashed, baked with meat, or added to sweet desserts. The plantain can also be used at all stages of ripeness, making it a highly versatile and cost efficient addition to the dietary intake.

In order to reach the meat of the plantain, the user typically cuts off the top and bottom ends with a sharp knife. With the tip of the knife, the user then makes a slit in the skin of the plantain from top to bottom and works the peel away from the inner substance. Less ripe plantains have tough skins that must be cut with a sharp knife in order to peel the fruit. The banana shape of the plantain is awkward to peel with a knife and can be time consuming and lead to cuts on the fingers or hands if the knife slips. Additionally, if excessive pressure is applied to the plantain while holding it steady for peeling, the edible portion can become bruised. Therefore, a device which would remove the peel from the plantain without bruising its edible portion would represent a more efficient and safer method for peeling plantains. In establishments where large numbers of plantains are peeled, this type of device could also lead to a more cost efficient use of labor.

The use of vegetable and fruit peelers is known in the prior art. For example, U.S. Pat. No. 6,253,670 B1 to Michael Gingras discloses an apparatus for peeling and optionally cutting vegetables such a cucumbers, turnips, carrots, or potatoes. The apparatus has a frame defining a hole sized to receive and let pass the vegetable to be peeled and a given number of knives mounted in such a manner as to be radially slideable toward the center of the hole. Springs are provided which apply a radial force toward the center and hold the knives in a desired position for peeling all sides of the vegetables at once. However, the Gingras '670 B1 patent does not provide a refuse tray for collection and easy disposal of peels, thus the peels would be free to fall on the countertop, table, or floor, causing additional cleanup for the user. Furthermore, the Gingras '670 B1 device requires the user to manually push the vegetable through the opening and retrieve it from the back of the device. Many vegetables are slippery, especially as they are peeled, and would require a tight grip for this process to be accomplished. The user could inadvertently cut his fingers or severely bruise the vegetable while retrieving it from the back of the Gingras '670 B1 device.

U.S. Pat. No. 5,105,735 to Jose P. Gonzalvo discloses a machine for peeling oranges and similar fruits that consists of a chassis with arms for holding and turning the fruit and a cutting mechanism for peeling the fruit. The fruit is positioned on the arms and is subsequently rotated against the cutting mechanism. However, the Gonzalvo '735 patent is only useful for globular fruits and vegetables, and would not be suitable for elongated varieties due to the positioning of the blades and the arms of the device. Furthermore, the spikes with which the Gonzalvo '735 device secures the fruit would damage the pulp of softer fruits like bananas. Finally, the Gonzalvo '735 patent does not provide a container in which peels are collected, resulting in additional clean up time for the user.

Similarly, U.S. Pat. No. 4,738,195 to James A. Berube and W. Garrett Howard discloses a fruit peeling machine that cuts strips of peel from citrus fruits, particularly for the purpose of producing twists from such fruits as lemons and limes. Cutting edges are arrayed such that the fruit can be forced downward by a plunger and the lower hemisphere of the fruit is peeled. However, the Berube, et al. '195 device requires the user to pass the fruit through the cutting array twice before it is fully peeled. Additionally, the plunger of the Berube, et al. '195 device places pressure upon the fruit to force it through the cutting edges and would mash fruits or vegetables having a soft pulp, such as bananas or avocadoes. Finally, the Berube, et al. '195 device would not cut the ends of the rind from fruits and vegetables, requiring manual intervention by the user.

U.S. Pat. No. 2,396,444 to Henry Singer discloses a device for peeling citrus fruit wherein the blade and knife elements function to slice and then peel away the rind of the fruit. The ends of the fruit are first sliced off to provide a level surface, the fruit is then impaled on a post, and the knives subsequently slice and peel the fruit. However, the Singer '444 device still requires the user to manually slice off the ends of the fruit. Given the globular nature of citrus fruit, this presents a safety hazard to the user. Additionally, since the fruit must be impaled on a rod, the Singer '444 device would not be useful for arcuate items, such as plantains, since the rod would not successfully pierce both ends. Finally, the Singer '444 device would not be useful for peeling fruits that are easily malleable since impaling them on a rod would cause them to break into two or more pieces.

Likewise, U.S. Pat. No. Des.435, 404 to Michel Gingras and Mario Primeau discloses the ornamental design for a vegetable peeling apparatus. The apparatus has a frame defining a hole sized to receive and let pass the vegetable to be peeled and a given number of knives mounted in a horizontal fashion above and below the opening through which the vegetable passes and by which the peel of the vegetable will be scraped away. However, the Gingras, et al. '404 patent fails to provide a refuse tray for collection and easy disposal of peels, thus the peels would be free to fall on the countertop, table, or floor, causing additional cleanup for the user. Furthermore, the Gingras, et al. '404 device requires the user to manually push the vegetable through the opening and retrieve it from the back of the device. Many vegetables are slippery, especially as they are peeled, and would require a tight grip for this process to be accomplished. The user could inadvertently cut his fingers or severely bruise the vegetable while retrieving it from the back of the Gingras, et al. '404 device.

Lastly, U.S. Pat. No. 4,446,782 to Leslie Black discloses a banana peeling machine in which the skin of a banana is engaged by impinging spikes on the periphery of three resiliently supported rotatable wheels with separating and cutting means to assist in the skin being pulled away from the banana. However, the Black '782 patent fails to provide any type of housing or covering for the spikes and blades employed by the device. This creates a safety hazard for the user who could cut his hand, finger, or arm during operation of the device. Storing the Black '782 device on the countertop might tempt children to play with it, possibly leading to subsequent injuries, and storing the device in a cabinet could result in cuts on the hand or fingers when the user reached for the device or any item near it. Finally, the Black '782 patent fails to provide a refuse collection container, leaving the banana peels free to fall on the floor, the table, or the cabinet and causing an excessive amount of cleaning for the user.

While the above-described devices fulfill their respective, particular objectives and requirements, the aforementioned patents do not describe a plantain peeler that allows the user to easily and safely remove the rough exterior from a plantain. The Gingras '670 B1, Gonzalvo '735, Gingras, et al. '404, and Black '782 patents do not provide a refuse tray for collection and easy disposal of peels, thus the peels would be free to fall on the countertop, table, or floor, causing additional cleanup for the user. Furthermore, use of the Gingras '670 B1, Gingras, et al. '404, and Black '782 devices could result in injury to the user. The Gingras '670 B1 and Gingras, et al. '404 devices require the user to manually push the vegetable through the opening and retrieve it from the back of the device. Due to the slippery nature of many peeled vegetables and fruit, the user could inadvertently cut his fingers while gripping the food item tightly enough to retrieve it from the device. Moreover, the vegetable could be severely bruised from the amount of pressure applied to the vegetable while using the Gingras '670 B1 and Gingras, et al. '404 devices. The Black '782 patent fails to provide any type of housing or covering for the spikes and blades employed by the device. This creates a safety hazard for the user who could cut his hand, finger, or arm during operation of the device, for the curious child who is tempted to play with the device, or to the owner who reaches into a cabinet in which the device is stored. The Gonzalvo '735 device is only useful for globular fruits and vegetables, and would not be suitable for elongated varieties due to the positioning of the blades and the arms of the device. Additionally, the Gonzalvo '735, Berube, et al. '195, and the Singer '444 devices would not be suitable for peeling fruits or vegetables with a soft pulp, such as bananas or avocadoes. The spikes with which the Gonzalvo '735 device secures the fruit would damage the pulp of softer fruits, while the pressure placed on the fruit by the plunger of the Berube, et al. '195 device would mash fruits or vegetables having a soft pulp. In addition, impaling the fruit on the rod of the Singer '444 device would cause it to split into parts. Furthermore, since the fruit must be impaled on a rod, the Singer '444 device would not be useful for arcuate items, such as plantains, since the rod would not successfully pierce both ends. Neither the Berube, et al. '195 nor Singer '444 devices are capable of cutting the ends of the rind from the fruits and require the manual interaction of the user to perform this task. Finally, the Berube, et al. '195 device requires the user to pass the fruit through the cutting array twice before it is fully peeled.

Therefore, a need exists for a new and improved plantain peeler that can be used for easily and safely removing the skin from a plantain without bruising the fruit in the process. In this regard, the present invention substantially fulfills this need. In this respect, the plantain peeler according to the present invention substantially departs from the conventional concepts and designs of the prior art, and in doing so provides an apparatus primarily developed for the purpose of easily and safely removing the peel from the plantain without bruising its edible portion.

SUMMARY OF THE INVENTION

In view of the foregoing disadvantages inherent in the known types of fruit and vegetable peelers now present in the prior art, the present invention provides an improved plantain peeler, and overcomes the above-mentioned disadvantages and drawbacks of the prior art. As such, the general purpose of the present invention, which will be described subsequently in greater detail, is to provide a new and improved plantain peeler and method which has all the advantages of the prior art mentioned heretofore and many novel features that result in a plantain peeler which is not anticipated, rendered obvious, suggested, or even implied by the prior art, either alone or in any combination thereof.

To attain this, the present invention essentially comprises a housing including a discard tray, a slicing mechanism with four semicircular cutting blades driven by a piston rod attached to a guide ring, and a peeling mechanism with four arcuate blades arranged in a circle whose dimensions expand and contract through the use of four tension springs on the arcuate blades.

There has thus been outlined, rather broadly, the more important features of the invention in order that the detailed description thereof that follows may be better understood and in order that the present contribution to the art may be better appreciated.

There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved plantain peeler that has all of the advantages of the prior art fruit and vegetable peelers and none of the disadvantages.

It is another object of the present invention to provide a new and improved plantain peeler that may be easily and efficiently manufactured and marketed.

An even further object of the present invention is to provide a new and improved plantain peeler that has a low cost of manufacture with regard to both materials and labor, and which accordingly is then susceptible of low prices of sale to the consuming public, thereby making such a plantain peeler economically available to the buying public.

Still another object of the present invention is to provide a new plantain peeler that provides in the apparatuses and methods of the prior art some of the advantages thereof, while simultaneously overcoming some of the disadvantages normally associated therewith.

Even still another object of the present invention is to provide a plantain peeler for quickly removing the peel from a plantain. This allows the user to speed the process of peeling multiple plantains, saving time and making the cooking experience more enjoyable.

Yet another object of the present invention is to provide a plantain peeler which does not require the user to slice the thick skin of the plantain with a sharp knife. This allows the user to remove the peel from the plantain while eliminating the possibility of the user cutting his hand or fingers on a sharp knife blade.

Even yet another object of the present invention is to provide a plantain peeler which improves the efficiency of removing a peel from a plantain. This allows the user to save considerable time and labor when peeling multiple plantains, especially when preparing plantains for a large group or in a commercial establishment.

Still yet another object of the plantain peeler is to provide a plantain peeler with a splashguard surrounding the peeling mechanism. This restricts juices and small portions of the peel or plantain from entering the device, making cleaning of the device easier and less time consuming.

Lastly, it is an object of the present invention to provide a new and improved plantain peeler that has a discard tray for the peel of the plantain. This provides a convenient bin into which the peel falls as it is forced from the plantain, speeding the clean up process by eliminating the need to wash sticky residue from the counter, table, floor, or other area where a peel could normally fall.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE PREFERRED EMBODIMENT

Figure 1:
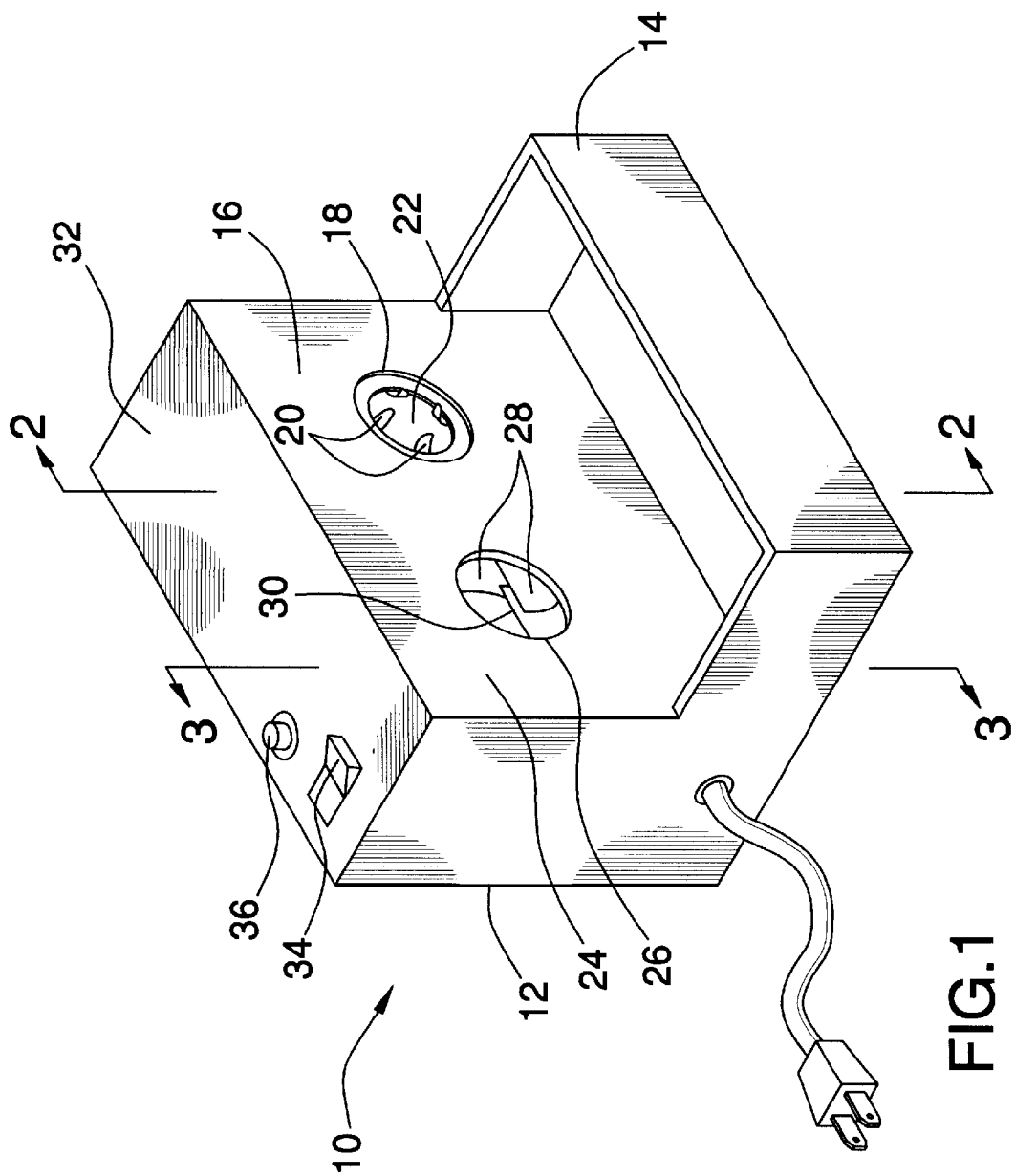
FIG. 1 is a front perspective view of the preferred embodiment of the plantain peeler constructed in accordance with the principles of the present invention.

Referring now to the drawings, and particularly to FIGS. 1–4, a preferred embodiment of the plantain peeler of the present invention is shown and generally designated by the reference numeral 10.

In FIG. 1, a new and improved plantain peeler 10 of the present invention for easily and safely removing the peel from a plantain is illustrated and will be described. More particularly, the plantain peeler 10 has a rectangular housing 12 with a refuse collection tray 14 extending from the bottom front portion. Centered on the right half 16 of the housing 12 is a peeling mechanism 18 which is responsible for forcing the peel from a plantain. Four arcuate blades 20 are spaced equidistant around a plantain insertion hole 22. Centered on the left half 24 of the housing 12 is a slicing mechanism 26 which is responsible for slicing the ends from a plantain. The slicing mechanism features four semi-circular slicing blades 28, each having a sharp straight edge 30. On the top 32 of the housing 12 are a power activation switch 34 and a blade activation button 36. Pushing the blade activation button 36 rotates the normally open slicing blades 28 toward each other so that the end of a plantain can be removed. The plantain peeler has a power cord 80 with a standard electrical plug 82 at its end.

Figure 2:
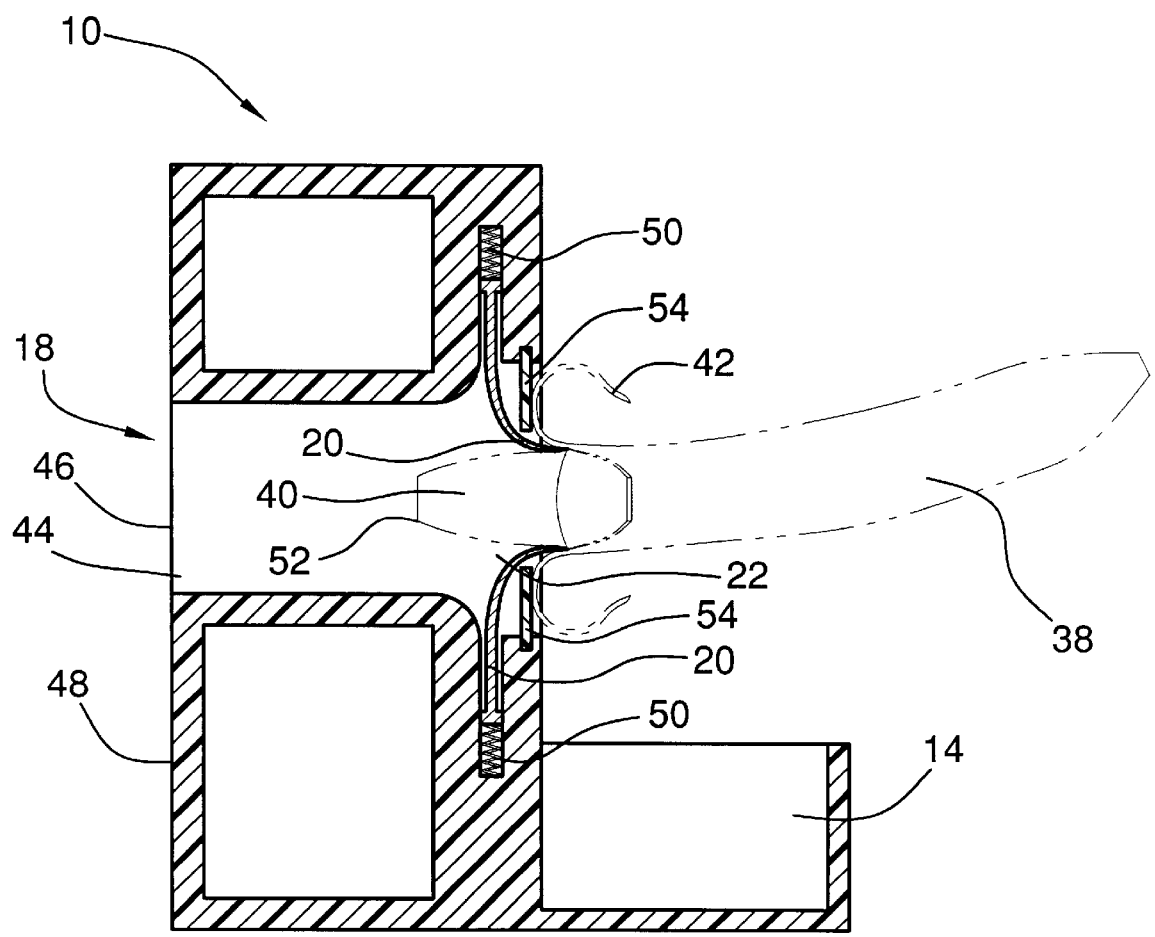
FIG. 2 is a left side sectional view of the peeling mechanism of the plantain peeler of the present invention.

FIG. 2 shows a right side sectional view of the peeling mechanism 18 of the plantain peeler 10. As the plantain 38 is forced through the insertion hole 22, the tips of the arcuate blades 20 are inserted between the pulp 40 and the peel 42 of the plantain 38. As the length of the plantain 38 travels through the insertion hole 22, the arcuate blades 20 force the peel 42 away from the pulp 40. The peel 42 falls into the refuse collection tray 14, while the plantain 38 travels through the plantain channel 44 of the housing 12 and out the plantain retrieval opening 46 located on the rear 48 of the housing 12. Each of the arcuate blades 20 is held under pressure by a tension spring 50. The springs 50 are set to normally hold the arcuate blades 20 in a position to admit the smallest portion of the plantain 38, which would be the tip 52. As the plantain 38 progresses through the insertion hole 22, the increased diameter of the plantain forces the arcuate blades 20 farther apart. The peeling mechanism 18 also features a plastic splashguard 54 which forms a ring around the arcuate blades 20 preventing entry of any sticky juices and bits of peel or pulp into the interior of the housing 12.

Figure 3:
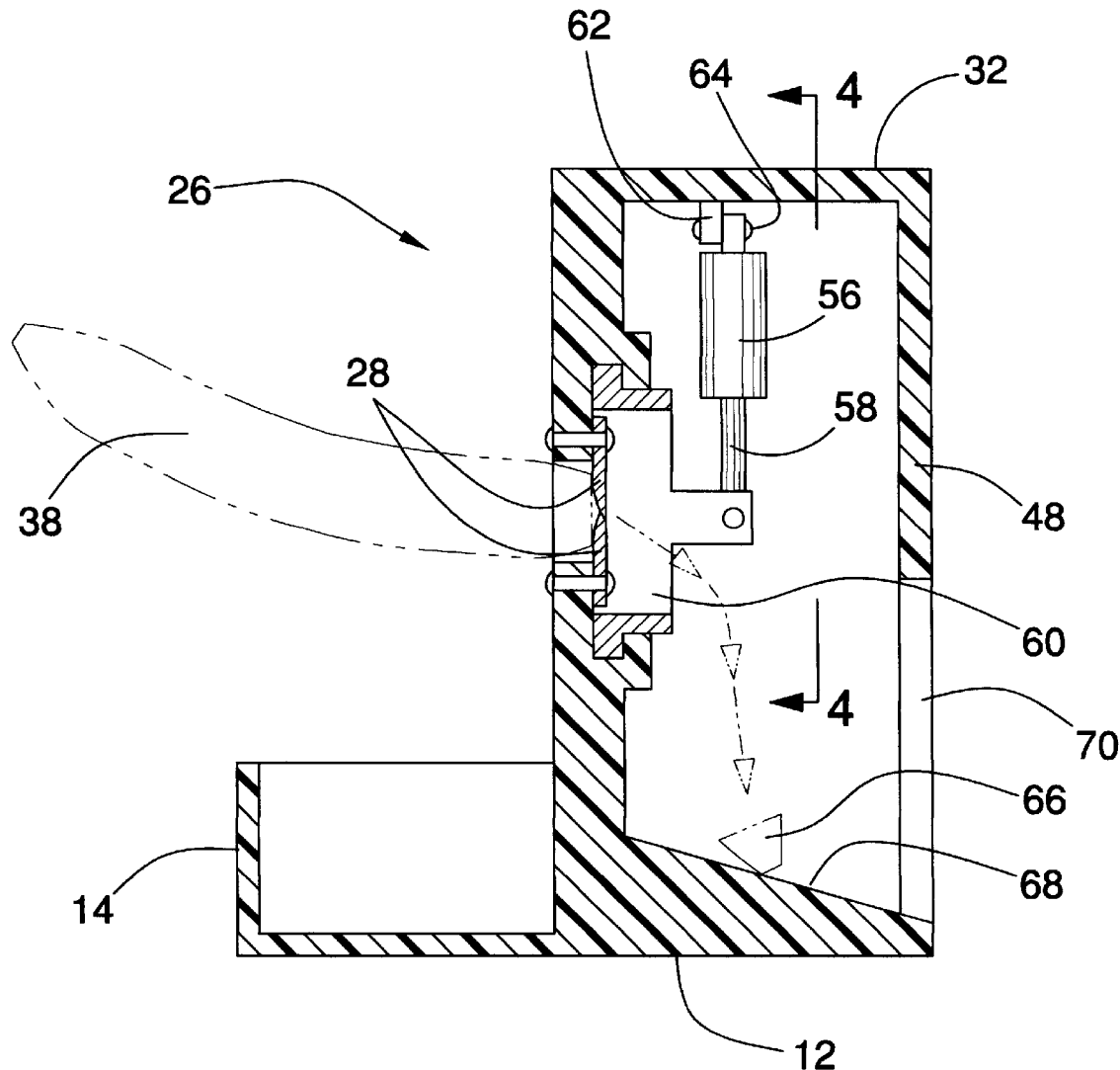
FIG. 3 is a right side sectional view of the slicing mechanism of the plantain peeler of the present invention.

FIG. 3 shows a left side sectional view of the slicing mechanism 26 of the plantain peeler 10. The slicing blades 28 are rotated between an open and closed position through the force provided by a piston 56. The piston 56 forces a piston rod 58 up and down, which in turn rotates the circular blade guide 60 which controls the slicing blades 28. A better understanding of this function can be gained from FIG. 4. The piston 56 is attached to a mounting bracket 62 by a bolt 64, effectively securing the piston 56 to the top 32 of the housing 12. Once the tip 66 of an unpeeled plantain 38 is placed in the center of the normally open slicing blades 28, the blade activation button 36 is pushed, and the tip 66 of the plantain 38 is sliced off and falls onto the waste ramp 68 inside the housing 12. The waste ramp 68 is angled toward the tip retrieval opening 70 located on the rear 48 of the housing 12.

Figure 4:
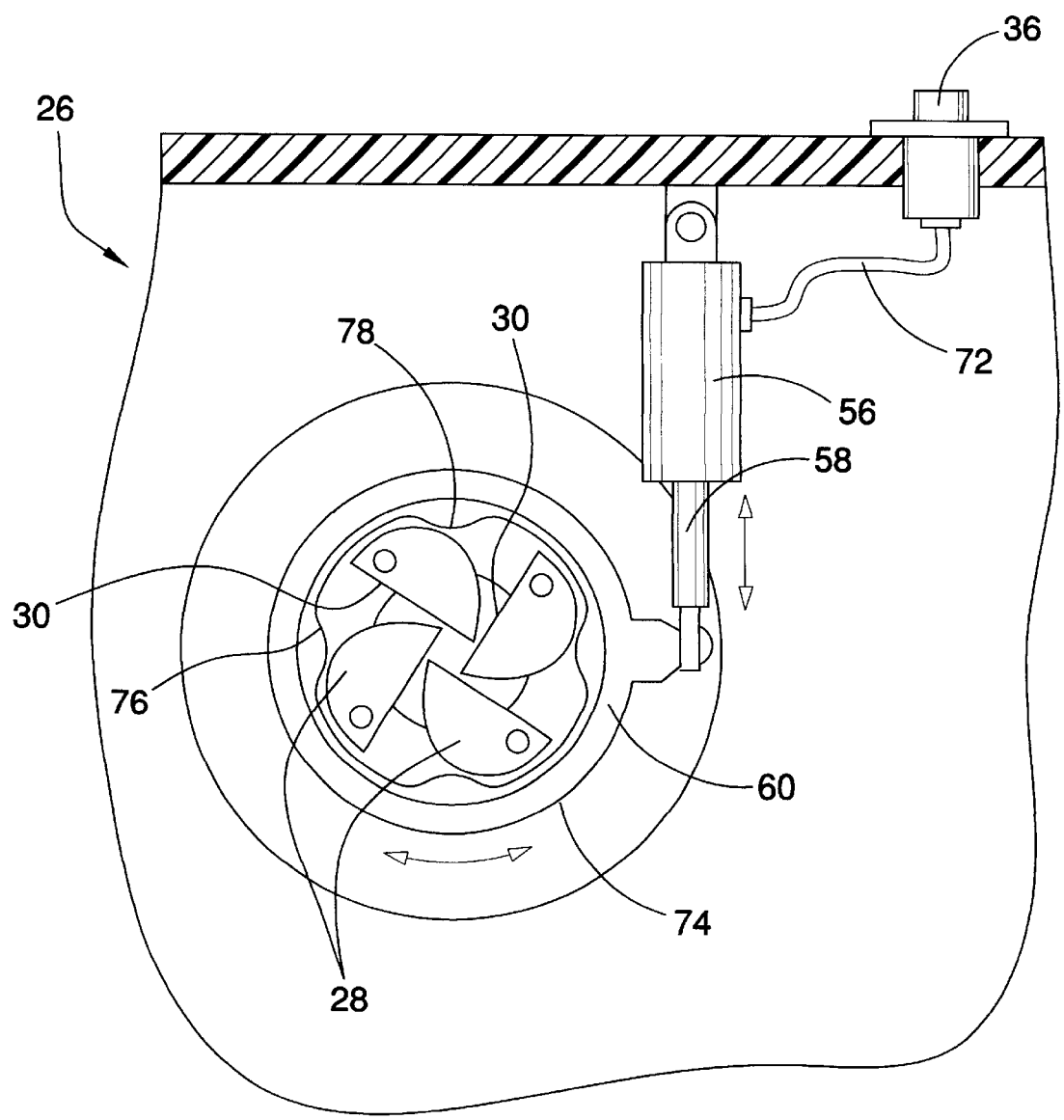
FIG. 4 is a rear sectional view of the slicing mechanism of the plantain peeler of the present invention.

FIG. 4 shows a rear sectional view of the slicing mechanism 26 of the plantain peeler 10. This figure shows the connecting wire 72 between the push style blade activation button 36 and the piston 56. When the blade activation button 36 is pushed, the piston 56 forces the piston rod 58 downwards. The piston rod 58 is connected to the circular blade guide 60 in such a manner that a downward movement of the piston rod 58 results in a clockwise movement of the circular blade guide 60. Subsequently, an upward movement of the piston rod 58 results in a counterclockwise movement of the circular blade guide 60. The circular blade guide 60 is a ring shaped unit with a circular outer edge 74 and an inner edge 76 formed with slight convex indentations 78 between each slicing blade 28 that force the slicing blades 28 inward toward each other when the circular blade guide 60 rotates in a clockwise direction.

In use, it can now be understood that the user would insert the tip 66 of an unpeeled plantain 38 into the center of the open slicing blades 28. He would then push the blade activation button 36, and the slicing blades 28 would close around the plantain 38 and slice off the tip. The user would then place the plantain 38 into the insertion hole 22 with the trimmed end facing the arcuate blades 20. The plantain 38 would be pushed through the insertion hole 22, and the arcuate blades 20 would widen and contract as they run underneath the skin of the plaintain 38. The peeled plantain 38 could be retrieved at the plantain retrieval opening 46 located on the rear 48 of the housing 12. The skin would fall into the refuse collection tray 14, which could be emptied when the user had peeled the desired number of plantains 38. The discarded tips 66 cut from the plantains 38 could be gathered from the tip retrieval opening 70 located on the rear 48 of the housing 12 and thrown away.

While a preferred embodiment of the plantain peeler has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable sturdy material such as metal, plastic, or a variety of wood may be used for the housing. And although peeling the skin from a plantain has been described, it should be appreciated that the plantain peeler herein described is also suitable for peeling and slicing a wide variety of fruits and vegetables.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A plantain peeler comprising:
   a rectangular housing having an interior, an exterior, a front formed with a first transverse aperture and a second transverse aperture, a back formed with a first opening and a second opening, a right side perpendicular to said front and joining said front to said back, a left side parallel to said right side, a top perpendicular to said front and said right side and joining said right side to said left side, and a bottom parallel to said top;
   a power activation switch connected to said exterior of said housing;
   a slicing mechanism activation button having an activated position and a deactivated position and connected to said exterior of said housing;
   a power cord having a first end and a second end and connected to said exterior of said housing on said first end;
   a standard electrical plug connected to said second end of said power cord;
   a slicing mechanism connected to said housing;
   a peeling mechanism connected to said housing; and
   a discard tray connected to said front of said housing wherein said tray is perpendicular to and extends forward from said front of said housing.

2. The plantain peeler of claim 1 wherein said slicing mechanism further comprises:
   a piston;
   a piston rod connected to said piston and capable of downward movement when said slicing mechanism activation button is in said activated position and of upward movement after said slicing mechanism activation button is released and returned to said deactivated position;
   a mounting bracket connecting said piston to said interior of said top of said housing;
   a bolt connected to said piston and said mounting bracket wherein said bolt secures said piston to said mounting bracket;
   an electrical wire connecting said slicing mechanism activation button to said piston;
   a ring-shaped slicing guide having a circular outer edge and a rounded cross-shaped inner edge with four spokes and four concave arcs wherein each said arc is between two said spokes and connected to said front of said housing wherein said slicing guide is inserted into one of said transverse apertures on said front of said housing and connected to said piston rod wherein said slicing guide moves in a clockwise direction when said piston rod moves downward and said slicing guide moves in a counterclockwise direction when said piston rod moves upward; and
   a plurality of semicircular cutting blades, each having a rounded edge dimensioned to fit in said spoke of said inner edge of said slicing guide and a sharp straight edge and connected to said slicing guide wherein each said blade is positioned with straight edge inward when said slicing mechanism activation button is in said deactivated position and each said blade rotates in a clockwise direction bringing said straight edges toward each other when said slicing mechanism activation button is in said activated position.

3. The plantain peeler of claim 2 wherein said housing further comprises a ramp having a top end and a bottom end and connected to said interior of said housing wherein said ramp is below said first aperture in said front of said housing and said top end of said ramp connects to said interior of said front of said housing and is higher than said bottom end of said ramp which lines up with said first opening in said rear of said housing.

4. The plantain peeler of claim 3 wherein said cutting blades form an aperture when said slicing mechanism activation button is in said deactivated position wherein the end of a piece of elongated food can be inserted into said aperture and said end is sliced off when said slicing mechanism activation button is placed in said activated position.

5. The plantain peeler of claim 4 wherein said end of said piece of food falls onto said ramp and is capable of being retrieved at said first opening in said rear of said housing.

6. The plantain peeler of claim 1 wherein said housing is formed with a horizontal passage from said second transverse aperture in said front of said housing to said second opening in said rear of said housing and is also formed with a plurality of slots in said interior of said housing wherein said slots are spaced equidistant around said second aperture in said front of said housing.

7. The plantain peeler of claim 6 wherein said peeling mechanism further comprises:
   a plurality of tension springs connected to said housing wherein one said spring exists in each said slot formed in said housing;
   a plurality of arcuate blades formed with a straight portion and an arced portion and connected to springs wherein each said arcuate blade is connected on said straight portion to one said spring and said arced portion of each said arcuate blade extends outward through said second transverse aperture in said front of said housing.

8. The plantain peeler of claim 7 further comprising:
   a circular splash guard ring formed to fit between said arcuate blades and said housing wherein said splash guard ring is inserted into said second transverse aperture blocking the open space between said arcuate blades and said front of said housing.

9. The plantain peeler of claim 8 wherein an elongated fruit or vegetable can be inserted into said second aperture in said front of said housing wherein said arcuate blades pass between the peel and the pulp of said fruit or vegetable, forcing said peel from said pulp as said fruit or vegetable is further inserted into said second aperture.

10. The plantain peeler of claim 9 wherein said pulp of said fruit or said vegetable passes through said horizontal passage in said housing after passing through said peeling mechanism and can be retrieved from said second opening in said rear of said housing.

11. The plantain peeler of claim 10 wherein said peel of said fruit or said vegetable falls into said discard tray as it is forced from said pulp of said fruit or said vegetable.

12. The plantain peeler of claim 1 wherein said discard tray has a rectangular shape with an open top, a bottom, a right side perpendicular to said bottom, a left side parallel to said right side, and a front perpendicular to said bottom and said right side and joining said right side to said left side.

13. A plantain peeler comprising:
- a rectangular housing having an interior, an exterior, a front formed with a first transverse aperture and a second transverse aperture, a back formed with a first opening and a second opening, a right side perpendicular to said front and joining said front to said back, a left side parallel to said right side, a top perpendicular to said front and said right side and joining said right side to said left side, and a bottom parallel to said top and formed with a horizontal passage from said second transverse aperture in said front of said housing to said second opening in said rear of said housing and a plurality of slots in said interior of said housing wherein said slots are spaced equidistant around said second aperture in said front of said housing;
- a power activation switch connected to said exterior of said housing;
- a slicing mechanism activation button having an activated position and a deactivated position and connected to said exterior of said housing;
- a power cord having a first end and a second end and connected to said exterior of said housing on said first end;
- a standard electrical plug connected to said second end of said power cord;
- a mounting bracket connected to said interior of said top of said housing;
- a piston connected to said mounting bracket;
- a bolt connected to said piston and said mounting bracket wherein said bolt secures said piston to said mounting bracket;
- a piston rod connected to said piston and capable of downward movement when said slicing mechanism activation button is in said activated position and of upward movement after said slicing mechanism activation button is released and returned to said deactivated position;
- an electrical wire connecting said slicing mechanism activation button to said piston;
- a ring-shaped slicing guide having a circular outer edge and a rounded cross-shaped inner edge with four spokes and four concave arcs wherein each said arc is between two said spokes and connected to said front of said housing wherein said slicing guide is inserted into one of said transverse apertures on said front of said housing and connected to said piston rod wherein said slicing guide moves in a clockwise direction when said piston rod moves downward and said slicing guide moves in a counterclockwise direction when said piston rod moves upward; and
- a plurality of semicircular cutting blades, each having a rounded edge dimensioned to fit in said spoke of said inner edge of said slicing guide and a sharp straight edge and connected to said slicing guide wherein each said blade is positioned with straight edge inward when said slicing mechanism activation button is in said deactivated position and each said blade rotates in a clockwise direction bringing said straight edges toward each other when said slicing mechanism activation button is in said activated position,
- a plurality of tension springs connected to said housing wherein one said spring exists in each said slot formed in said housing;
- a plurality of arcuate blades formed with a straight portion and an arced portion and connected to springs wherein each said arcuate blade is connected on said straight portion to one said spring and said arced portion of each said arcuate blade extends outward through said second transverse aperture in said front of said housing; and
- a rectangular discard tray having an open top, a bottom, a right side perpendicular to said bottom, a left side parallel to said right side, and a front perpendicular to said bottom and said right side and joining said right side to said left side and connected to said front of said housing on said right side and said left side wherein said tray is perpendicular to and extends forward from said front of said housing.

14. The plantain peeler of claim 13 wherein said housing further comprises a ramp having a top end and a bottom end and connected to said interior of said housing wherein said ramp is below said first aperture in said front of said housing and said top end of said ramp connects to said interior of said front of said housing and is higher than said bottom end of said ramp which lines up with said first opening in said rear of said housing.

15. The plantain peeler of claim 14 wherein said cutting blades form an aperture when said slicing mechanism activation button is in said deactivated position wherein the end of a piece of elongated food can be inserted into said aperture and said end is sliced off when said slicing mechanism activation button is placed in said activated position.

16. The plantain peeler of claim 15 wherein said end of said piece of food falls onto said ramp and is capable of being retrieved at said first opening in said rear of said housing.

17. The plantain peeler of claim 16 further comprising:
- a circular splash guard ring formed to fit between said arcuate blades and said housing wherein said splash guard ring is inserted into said second transverse aperture blocking the open space between said arcuate blades and said front of said housing.

18. The plantain peeler of claim 17 wherein an elongated fruit or vegetable can be inserted into said second aperture in said front of said housing wherein said arcuate blades pass between the peel and the pulp of said fruit or vegetable, forcing said peel from said pulp as said fruit or vegetable is further inserted into said second aperture.

19. The plantain peeler of claim 18 wherein said pulp of said fruit or said vegetable passes through said horizontal passage in said housing after passing through said peeling mechanism and can be retrieved from said second opening in said rear of said housing.

20. The plantain peeler of claim 19 wherein said peel of said fruit or said vegetable falls into said discard tray as it is forced from said pulp of said fruit or said vegetable.

* * * * *